Patented Dec. 10, 1935

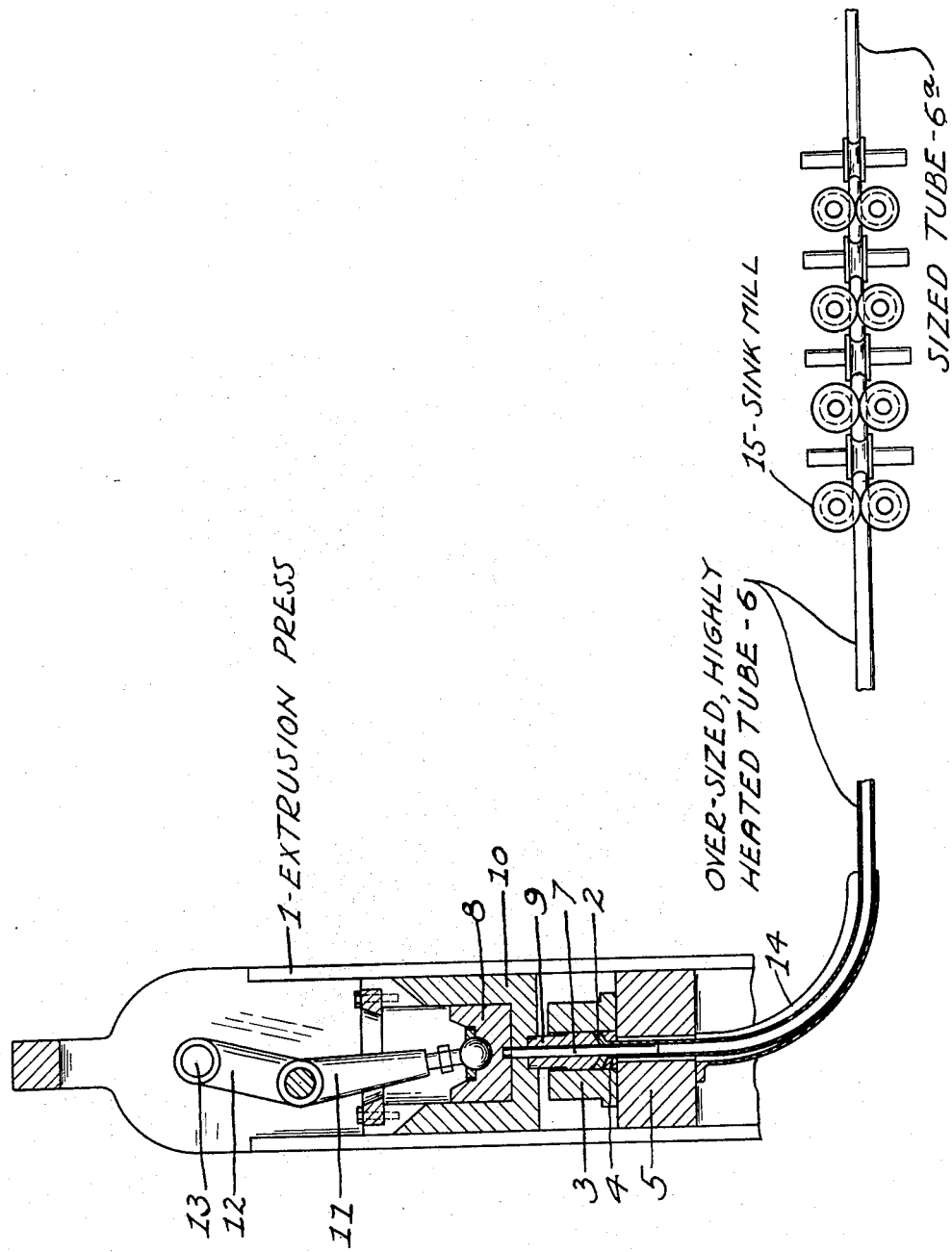

2,023,776

UNITED STATES PATENT OFFICE 2,023,776

PRODUCTION OF SEAMLESS TUBES AND OTHER ELONGATE ARTICLES

Adolf Wefing, Witten/Ruhr, Germany, assignor to Tubus A. G., Zurich, Switzerland Application May 4, 1934, Serial No. 723,842
In Germany January 13, 1933

3 Claims. (Cl. 29—156)

This invention relates to the manufacture of seamless tubing and similar elongate metallic articles, such as solid sections, e. g., rods For ease of reference and for purposes of illustration the production of seamless tubes may be referred to, although the invention is not limited thereto. In ordinary processes of producing seamless tubes a multiplicity of steps are necessary, including the forming of a billet, heating the billet, piercing the heated billet, and elongation of the pierced billet in one of the conventional apparatuses, such as a pilger mill. Thereafter the blank is commonly subjected to a reducing operation, to bring it to desired size, and for this purpose reheating of the elongated blank is necessary prior to reduction, and, it may be, also between various steps of the reducing operation. Such procedures are disadvantageous because of the multiplicity of steps and the additional heating operation required for reducing, which adds to the cost burden, materially slows down production, and may be otherwise objectionable.

The extrusion process is theoretically more attractive because it affords a means of producing seamless tubes in a single step. This operation is advantageous not only for that reason, but also because it is applicable, generally speaking, to all grades of common and alloyed steels. By virtue of these features the extrusion production of seamless tubes and the like elongate articles should be cheaper than the processes ordinarily used, such as those referred to hereinabove. The greatest economy would follow from the use of large billets, for thereby fewer operations would produce longer tubes than where small billets are extruded. When it is attempted to use large billets, however, there is encountered the serious drawback that as the size of the billet is increased in the production of a tube of given size, the wear and tear upon the mandrel is definitely and materially greater, as compared with the production of tubes of the same size from smaller billets. This factor may become so serious in attempting to use large billets as to offset other advantages of the extrusion process.

It is a major object of this invention to produce seamless tubes and other elongate articles of relatively small section, e. g., not more than about three inches in diameter or greatest width, particularly from ferrous metals, such as steels, by a process which confers the advantages of extrusion procedures but in which larger billets may be operated upon, to provide greater lengths of product, than economically practical heretofore, in which the exaggerated mandrel wear heretofore encountered in extruding large size billets is minimized, which is rapid, readily operated, and otherwise embodies procedural and economic advantages, such as the use of standard types of apparatus.

In accordance with this invention seamless tubes and the like articles of great length relative to their section are made by extruding a heated billet to form an oversized article in a heated condition, and while the article is thus heated reducing it to the desired size. Referring to the manufacture of seamless tubes as an example, a heated billet of metal is extruded in a suitable extrusion press, using a mandrel and die of such size as to produce a tube of greater diameter than that desired. This oversized tube exudes from the die opening of the press in a highly heated condition, and I have discovered, and it is upon this that my invention is predicated in part, that the heat thus inherently in the tube as extruded is sufficient to permit it to be reduced to the desired size by subjecting it, without reheating, to a suitable reducing or sinking operation, for example, in a sink mill, or a suitable pilger or other mill, various types of which are known in the art.

The accompanying drawing is a diagrammatic view, partly in section, illustrative of one embodiment of the method provided by the invention and showing the formation of an oversized tube by extrusion and its conversion to a sized tube without intermediate heating.

In order to utilize the residual heat of extrusion to avoid reheating for the sinking step, the press must operate at high punch speeds, or, as an equivalent, the extruding time must be short. My experience thus far has shown that the most advantageous results are obtained by extruding at a punch speed of at least 3 inches per second, or by performing the extrusion proper within 2 or 5 seconds. As a result of the use of high punch speeds, i. e., short extrusion time, the extruded oversize tube will emerge from the press at about the temperature of the billet when inserted into the press, or even somewhat higher in temperature, which suffices to permit it to be subjected to the reducing, or sinking, operation without intermediate reheating. Since the temperature of the extruded article depends in part at least, upon the pressing speed, it is possible, by suitable regulation of the punch speed to the size of billet and size of extruded article, to regulate, and even increase, within certain limits, the temperature of the extruded tube, with concomitant advantage.

In the preferred practice of the invention as applied to tubes, the extrusions is conducted to provide a wall thickness approximately the same as that desired in the finished tube, the outer diameter of the extruded blank being greater (i. e., oversize) than that desired.

By such extrusion of an oversized tube and reduction to size it is thus possible to make long articles from larger billets with less mandrel wear than would result in extruding the same article to size from a billet of the same size, so that mandrel costs are materially reduced. In the sinking of the extruded tube its length is increased, so that the invention likewise results in the production of tubes of greater length than have heretofore been economically producible with the ordinary extrusion procedures as practiced heretofore. Through reduction of the oversized tube directly after extrusion use is made of the heat developed in the extrusion step, so that the reducing operation is possible without the intermediate reheatings that have been unavoidable in the commonly applied rolling and sinking processes of making seamless tubes, such as the well-known Mannesmann or Stiefel processes, as noted hereinabove. Likewise, the invention further reduces the number of steps required, since the extrusion step combines in one the prior separate piercing and elongating operations, and eliminates the reheating. The invention therefore overcomes the economical disadvantages of both procedures and provides further advantages over both.

The invention may be described further with reference to the drawing in which 1 represents an extrusion press adapted to extrude tubes rapidly, e. g. at high punch speeds, as described hereinabove, suitably of the type shown in reissue Patent No. 19,474 to Fritz Singer, reissued February 19, 1935. In the form of press shown a billet 2 is disposed in a container 3 having a matrix die 4 at its lower end. The container and matrix die are supported by a fixed table 5 provided with a centrally disposed bore for egress of the extruded tube 6. A mandrel 7 extends downwardly from a mandrel carrier 8 through a plunger 9 connected to a hollow plunger carrier 10 slidably mounted in the upper part of the press frame and in which the mandrel carrier moves as a piston, as may be seen from the drawing. The plunger and mandrel are actuated through a pitman 11 connected at its lower end to mandrel carrier 8 and at its upper end to a crank 12 driven by a crank shaft 13. The extruded tube 6 emerges from the press through the bore in table 5 and is guided away from the press by a channel 14.

The tube 6 is oversized, by appropriate selection of the mandrel and die, relative to the final product, and by appropriate operation of the press, as by high punch, or plunger, speed, it emerges in highly heated condition, as described hereinabove. The heated tube then passes directly, i. e., without intermediate reheating, to means for hot reducing it to finished size using the heat inherently in the tube as a result of the extrusion operation. The reducing means shown in the drawing comprises a sink mill, schematically indicated at 15, which operates upon the oversized and heated tube in the known manner to bring it to the desired external diameter while elongating it and increasing its wall thickness somewhat. In the drawing the sized tube is shown at 6a emerging from the sink mill.

The invention is especially useful in the production of articles from metals requiring high extrusion temperatures, such as steels and other ferrous metals. As an example of the invention reference may be made to the production of 1 inch seamless steel tubes. According to the extrusion processes as applied heretofore to such purposes such tubes would be produced using a mandrel having a diameter of $1\frac{1}{16}$ inch, and a matrix die ring having an inner diameter of $1\frac{3}{8}$ inch. These small size tools, especially the comparatively thin mandrel, are worn so rapidly in extruding steel that it is advisable, for reasons of economy, to use billets which do not exceed about 40 pounds in weight. The tube extruded from such a billet and with such tools will be about 23 feet long, weighing about 37.5 pounds.

In the practice of this invention tubes of the same final size are made by extruding a heated billet to form an oversize tube having an outer diameter of $2\frac{5}{8}$ inches and a wall thickness of about $\frac{1}{8}$ inch. For a tube of such size there may be used satisfactorily a billet weighing 104 pounds, which provides an extruded oversize tube 31 feet long. This is directly reduced, without intermediate reheating, to a 1 inch tube, and after the sinking operation has been completed the tube will be about 60 feet in length. The advantages flowing from the invention will be recognized from the foregoing figures.

A further advantage of the process provided by this invention resides in the fact that tubes of various final diameter can be produced from the same oversize tubes, i. e., using billets and extruding tools of the same size, the only difference residing in the extent of the reducing, or sinking, operation. When changing the final tube dimension, therefore, adaptation of the reducing mill only is required. For instance, using the $2\frac{5}{8}$-inch extruded tube referred to in the foregoing example it is possible to produce all gauges of tubing below 2 inches merely by appropriate adaptation of the reducing mill, or, alternatively, by providing several reducing mill units. Other advantages will be recognized by those familiar with the art.

According to the provisions of the Patent Statutes, I have explained the principle of my invention, and have described what I now consider to represent its best embodiment. However, I desire to have it understood that, within the scope of the appended claims, the invention may be practiced otherwise than as specifically described.

I claim:

1. A method of producing seamless tubes the greatest sectional width of which is not more than about three inches comprising piercing a heated billet and extruding the pierced billet through a die at an average punch speed of at least three inches per second to form a highly heated oversized tube, and reducing said tube to desired size utilizing the residual heat of extrusion.

2. A method of producing seamless tubes the greatest sectional width of which is not more than about three inches comprising piercing a heated billet and extruding the pierced billet through a die at an average punch speed of at least three inches per second to form a highly heated tube having approximately the desired wall thickness but oversized as to external diameter, and reducing the article to desired size utilizing the residual heat of extrusion.

3. A method of producing seamless tubes the greatest sectional width of which is not more than about three inches comprising piercing a heated billet and extruding the pierced billet through a die at an average punch speed of at least three inches per second to form a highly heated oversized tube, and subjecting it to a sink mill, utilizing the residual heat of extrusion in the tube, to reduce and elongate the oversized article to bring it to desired size.

ADOLF WEFING.